(12) United States Patent
Neet et al.

(10) Patent No.: US 10,181,658 B2
(45) Date of Patent: Jan. 15, 2019

(54) ELECTRIC MACHINE WITH ELECTRICAL CONNECTOR

(71) Applicant: REMY TECHNOLOGIES, LLC, Pendleton, IN (US)

(72) Inventors: Kirk Neet, Pendleton, IN (US); Christopher Bledsoe, Anderson, IN (US); James Paul Murphy, Fishers, IN (US)

(73) Assignee: BORGWARNER INC., Auburn Hills, MI (US)

( * ) Notice: Subject to any disclaimer, the term of this patent is extended or adjusted under 35 U.S.C. 154(b) by 415 days.

(21) Appl. No.: 15/087,880

(22) Filed: Mar. 31, 2016

(65) Prior Publication Data

US 2017/0288318 A1 Oct. 5, 2017

(51) Int. Cl.
*H02K 11/00* (2016.01)
*H01R 4/2404* (2018.01)
(Continued)

(52) U.S. Cl.
CPC ........... *H01R 4/2404* (2013.01); *H01R 4/206* (2013.01); *H01R 4/2495* (2013.01); *H02K 3/50* (2013.01);
(Continued)

(58) Field of Classification Search
CPC ...... H01R 4/24; H01R 4/2404; H01R 4/2495; H01R 4/206; H02K 11/00; H02K 11/0094; H02K 11/049; H02K 3/50; H02K 11/046
(Continued)

(56) References Cited

U.S. PATENT DOCUMENTS 1,645,539 A 10/1927 Mau
3,320,354 A 5/1967 Marley et al.
(Continued)

FOREIGN PATENT DOCUMENTS

CN 102246391 A 11/2011
EP 0 270 602 B1 5/1991
(Continued)

OTHER PUBLICATIONS

International Search Report and Written Opinion of the International Searching Authority, PCT/US2017/021027, dated May 31, 2017, 13 pages.

*Primary Examiner* — Naishadh Desai
(74) *Attorney, Agent, or Firm* — Bose McKinney & Evans LLP

(57) ABSTRACT

An electric machine having a rotor, stator and at least one winding. The winding defines a first lead having a conductive core and an electrically insulative exterior layer. A connector engaged with the first lead includes a plurality of projections that pierce the exterior layer of the first lead to engage the conductive core. The connector may be C-shaped having a spine and first and second arms with first and second bend lines respectively disposed between the spine and the two arms. Alternatively, the connector may be U-shaped having a spine and first and first and second arms wherein a bend line and a central opening are disposed between the two arms. The first lead extends through the central opening and is grippingly engaged by the connector between the first and second arms. The connector may also be used to securely engage an uninsulated terminal.

20 Claims, 7 Drawing Sheets

(51) Int. Cl.
*H01R 4/2495* (2018.01)
*H01R 4/20* (2006.01)
*H02K 3/50* (2006.01)
*H02K 11/04* (2016.01)
*H02K 11/049* (2016.01)

(52) U.S. Cl.
CPC ....... *H02K 11/0094* (2013.01); *H02K 11/046* (2013.01); *H02K 11/049* (2016.01)

(58) Field of Classification Search
USPC .......................................................... 310/71
See application file for complete search history.

(56) References Cited

U.S. PATENT DOCUMENTS

| | | | |
|---|---|---|---|
| 3,380,013 A | | 4/1968 | Krone et al. |
| 3,611,263 A | * | 10/1971 | Krone .................. H01R 4/2416 439/395 |
| 3,826,861 A | * | 7/1974 | Karl ....................... H01R 4/188 174/84 C |
| 3,922,480 A | * | 11/1975 | Woofter .................. H01R 4/00 174/72 A |
| 3,955,044 A | * | 5/1976 | Hoffman ................ H01R 4/203 174/84 C |
| 5,895,994 A | | 4/1999 | Molnar et al. |
| 6,124,655 A | | 9/2000 | Jeske |
| 6,555,937 B2 | | 4/2003 | Kurahashi et al. |
| 6,617,723 B1 | | 9/2003 | Shichijyo |
| 7,462,081 B2 | | 12/2008 | Kato et al. |
| 2002/0142677 A1 | * | 10/2002 | Hosaka ................. H01R 4/024 439/874 |
| 2003/0020344 A1 | | 1/2003 | Futami et al. |
| 2005/0034294 A1 | | 2/2005 | Edrington |
| 2006/0003630 A1 | * | 1/2006 | Fargo .................... H01R 4/185 439/585 |
| 2006/0017337 A1 | | 1/2006 | Smith et al. |
| 2006/0192447 A1 | | 8/2006 | Bradfield |
| 2011/0175471 A1 | | 7/2011 | Marchitto et al. |
| 2012/0274162 A1 | | 11/2012 | Kleber |
| 2012/0329314 A1 | | 12/2012 | Adachi |
| 2013/0087532 A1 | * | 4/2013 | Gentry .................. H02K 13/04 219/85.22 |
| 2013/0307362 A1 | | 11/2013 | Chamberlin |
| 2014/0015358 A1 | | 1/2014 | Wan et al. |
| 2014/0028127 A1 | | 1/2014 | Chamberlin et al. |
| 2014/0113472 A1 | | 4/2014 | Chamberlin et al. |
| 2014/0265672 A1 | | 9/2014 | Bradfield |
| 2015/0017845 A1 | | 1/2015 | Tomita et al. |

FOREIGN PATENT DOCUMENTS

| | | |
|---|---|---|
| EP | 0 504 469 B1 | 9/1994 |
| KR | 101555062 B1 | 9/2015 |

\* cited by examiner

ELECTRIC MACHINE WITH ELECTRICAL CONNECTOR

BACKGROUND

Electric machines commonly employ stators having one or more windings. The windings often take the form of a conductive wire having an outer electrically insulative layer. During manufacture of the electric machine, the ends of the windings must be connected to the appropriate electric machine component. For example, in vehicle alternators, a terminal assembly is often used to electrically connect stator winding leads to diodes which rectify the alternating current (AC) generated by the alternator into direct current (DC) that is used to charge the vehicle battery. The stator leads must be connected to the conductive track of the terminal assembly.

Conventionally, the process to connect the winding lead to the terminal assembly involves stripping the outer insulative layer of the winding and then welding or soldering the conductive core of the winding to the conductive track of the terminal assembly.

The process of stripping or removing the outer insulative layer from the winding can be difficult. As a result, the stripping process reduces the efficiency of the manufacturing process and oftentimes leads to an inferior connection quality.

Improvements in the process of manufacturing such electrical machines is desirable.

SUMMARY

The present invention provides a connector that can be conductively coupled with the lead end of the winding in an efficient manner that does not require a separate process for removing the insulative layer of the winding.

The invention comprises, in one form thereof, an electric machine that includes a rotor and a stator wherein the stator includes at least one winding. A first end of the winding defines a first lead wherein the first lead of the winding has an exterior layer of an electrically insulative material disposed on an electrically conductive core. The electric machine also includes a conductive member with a connector conductively coupled with the conductive member. The connector conductively connects the conductive member with the first lead. The connector is formed of an electrically conductive material and is crimped to engage the first lead. The connector includes a plurality of projections wherein the projections pierce the exterior layer of the first lead to engage the conductive core of the first lead. The plurality of projections engage the first lead on opposing sides of the first lead whereby at least a portion of the projections engaged with the conductive core project toward each other.

In some embodiments, the connector also conductively connects the conductive member with a second lead wherein the second lead has an exterior layer of an electrically insulative material disposed on an electrically conductive core and the projections pierce the exterior layer of the second lead to engage the conductive core of the second lead and wherein the plurality of projections engage the second lead on opposing sides of the second lead whereby at least a portion of the projections are engaged with the conductive core project toward each other.

In some embodiments, the connector is a C-shaped connector having a spine and first and second arms disposed on opposite sides of the spine wherein the connector further defines first and second bend lines respectively disposed between the spine and the first and second arms. The first may take the form of an elongate member defining an axis wherein the axis of the first lead and the first and second bend lines of the C-shaped connector are all arranged parallel with each other. The C-shaped connector may also be used to secure both a first lead and a second lead wherein each of the first and second leads are elongate elements defining an axis and wherein the axes of the first and second leads and the first and second bend lines of the connector are all arranged parallel with each other.

In embodiments having a C-shaped connector that is used to secure two leads, the first lead may be engagingly gripped by the connector between the spine and the first arm with the second lead being engagingly gripped by the connector between the spine and the second arm. In such an embodiment, the plurality of projections may advantageously define a plurality of parallel, linearly extending projections, wherein the projections each extend in a direction perpendicular to the first and second bend lines. Such projections may be configured whereby each of the linearly extending projections extends across the first and second arms and the spine from a distal edge of the first arm to a distal edge of the second arm.

In other embodiments having a C-shaped connector, the conductive member may include a projecting terminal conductively coupled with the connector. In such an embodiment, the terminal may be disposed between one of the first and second arms and the spine and be conductively engaged by at least a portion of the plurality of projections. The terminal may advantageously have an exterior surface defined by a conductive material.

In yet additional embodiments including a C-shaped connector, the electric machine may include a plurality of such C-shaped connectors wherein each connector is conductively connected with a pair of leads and wherein each lead of the pair of leads forms the end of a stator winding.

In other embodiments of the electric machine, the connector is a U-shaped connector having a spine and first and first and second arms disposed on opposite sides of the spine. The U-shaped connector further defines at least one bend line between the first and second arms and a central opening disposed between the first and second arms. The first lead extends through the central opening and is grippingly engaged by the connector between the first and second arms.

In some embodiments having a U-shaped connector, the first lead defines an axis that extends perpendicular to the at least one bend line. In such an embodiment, the plurality of projections may advantageously define a plurality of parallel, linearly extending projections wherein the plurality of projections each extend in a direction parallel to the at least one bend line. Such projections may be configured whereby a first portion of the plurality of projections are disposed on the first arm and a second portion of the plurality of projections are disposed on the second arm. The U-shaped connector may also be integrally formed with the conductive member.

In some embodiments of the electric machine including a U-shaped connector, the U-shaped connector may be used to secure both a first lead and a second lead wherein the U-shaped connector conductively connects the conductive member with both the first and second leads and the second lead also has an exterior layer of an electrically insulative material disposed on an electrically conductive core and the projections pierce the exterior layer of the second lead end to engage the conductive core of the second lead and wherein the plurality of projections engage the second lead on opposing sides whereby at least a portion of the plurality of projections that are engaged with the conductive core project toward each other.

In those embodiments having a U-shaped connector that secures two leads, the first and second leads may take the form of an elongate element defining an axis wherein the axes of the first and second leads are parallel with each other and extend perpendicular to the at least one bend line.

In still other embodiments including a U-shaped connector, the electric machine may include a plurality of such U-shaped connectors wherein each connector is conductively connected with a pair of leads and wherein each lead of the pair of leads forms the end of a stator winding.

In the various embodiments of the electric machine, the connector may additionally be welded or soldered to the first lead. The connector may also be welded or soldered to any additional leads or terminals which are connected thereto.

In some embodiments, the conductive member includes a projecting terminal conductively coupled with the connector having an exterior surface defined by a conductive material and the terminal is disposed between one of the first and second arms and the spine and is conductively engaged by at least a portion of the plurality of projections. In other embodiments, the connector may be integrally formed with the conductive member.

The invention comprises, in another form thereof, an electric machine that includes a rotor and a stator wherein the stator includes at least one winding. A first end of the winding defines a first lead wherein the first lead of the winding has an exterior layer of an electrically insulative material disposed on an electrically conductive core. The electric machine also includes a conductive member having a projecting terminal wherein the terminal has an exterior surface defined by a conductive material. A connector is conductively coupled with the conductive member for conductively connecting the conductive member with the first lead. The connector is formed of an electrically conductive material and is crimped to engage the first lead and the terminal. The connector includes a plurality of projections wherein the projections pierce the exterior layer of the first lead to engage the conductive core of the first lead and wherein the plurality of projections engage the terminal to thereby conductively couple the terminal with the first lead.

In some embodiments, the plurality of projections engaged with the terminal pierce the exterior surface of the terminal and partially penetrate the terminal and the terminal defines a first thickness more than twice a projecting length of the plurality of projections. In such an embodiment, the lead may define a second thickness which is more than twice the projecting length of the plurality of projections. Advantageously, each of the first and second thicknesses are at least four times the projecting length of the plurality of projections.

In such embodiments, the connector may be a C-shaped connector having a spine and first and second arms disposed on opposite sides of the spine, the connector further defining first and second bend lines respectively disposed between the spine and the first and second arms, the first lead and the terminal each being an elongate element defining an axis wherein the axes of the first lead and the terminal and the first and second bend lines of the connector are all arranged parallel with each other. Alternatively, the connector may be a U-shaped connector having a spine and first and second arms disposed on opposite sides of the spine, the connector further defining at least one bend line between the first and second arms, the connector further defining a central opening disposed between the first and second arms, and wherein the first lead and the terminal both extend through the central opening and are grippingly engaged by the connector between the first and second arms.

The invention comprises, in still another form thereof, an electric machine having a rotor and a stator wherein the stator includes at least one winding. A first end of the winding defines a first lead wherein the first lead of the winding has an exterior layer of an electrically insulative material disposed on an electrically conductive core. The electric machine also includes a conductive member and a connector wherein the conductive member and the connector are both formed from a single sheet of conductive metal material. The connector conductively connects the conductive member with the first lead, the connector being crimped to engage the first lead, the connector including a plurality of projections wherein the projections pierce the exterior layer of the first lead to engage the conductive core of the first lead.

In such an embodiment, the connector may be a plurality of connectors wherein each of the plurality of connectors and the conductive member are formed out of a single sheet of conductive metal material.

In such embodiments, the plurality of connectors may each be a C-shaped connector having a spine and first and second arms disposed on opposite sides of the spine, each of the connectors further defining first and second bend lines respectively disposed between the spine and the first and second arms. Alternatively, the plurality of connectors may each be a U-shaped connector having a spine and first and second arms disposed on opposite sides of the spine wherein the connector further defines at least one bend line between the first and second arms and a central opening disposed between the first and second arms, and wherein the central opening is adapted to have the lead extend therethrough with the lead being grippingly engaged by the connector between the first and second arms.

BRIEF DESCRIPTION OF THE DRAWINGS

The above mentioned and other features of this invention, and the manner of attaining them, will become more apparent and the invention itself will be better understood by reference to the following description of embodiments of the invention taken in conjunction with the accompanying drawings, wherein.

Figure 1:
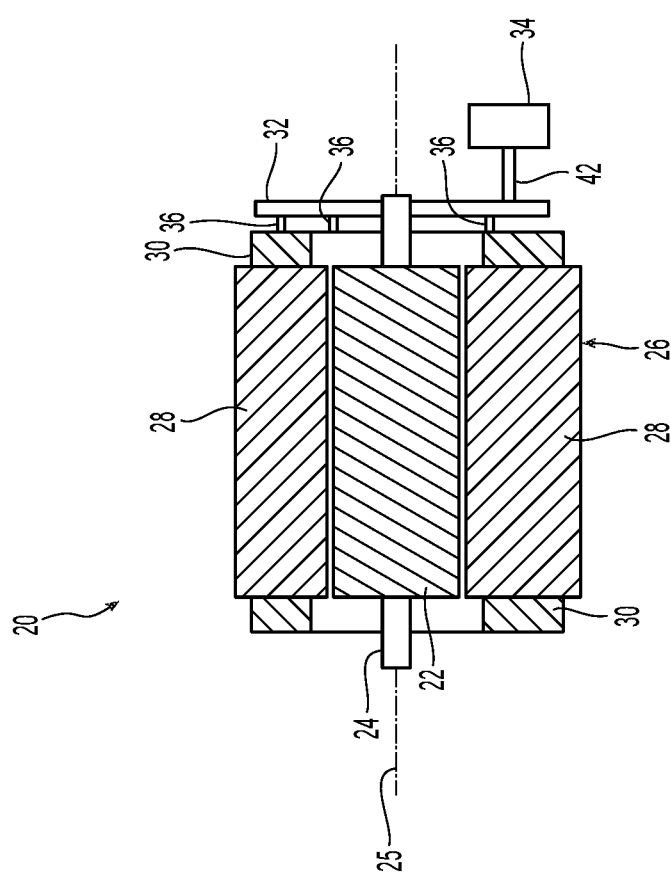
FIG. 1 is a schematic cross sectional view of an electric machine.

Corresponding reference characters indicate corresponding parts throughout the several views. Although the exemplification set out herein illustrates embodiments of the invention, in several forms, the embodiments disclosed below are not intended to be exhaustive or to be construed as limiting the scope of the invention to the precise forms disclosed.

DETAILED DESCRIPTION

An electric machine 20 is depicted in schematic form in FIG. 1. Electric machine 20 includes a rotor 22 which is mounted on a rotor shaft 24 which rotate together relative to stator 26 about axis 25. Stator 26 includes a stator core 28 and a plurality of windings 30 and is operably coupled with the rotor 22. As discussed in greater detail below, the ends of windings 30, often referred to as stator leads, are connected to a terminal assembly 32. In the illustrated embodiment, the electric machine 20 is an alternator for a vehicle and the terminal assembly 32 connects the windings 30 to a rectifier 34 whereby the alternating current generated by electric machine 20 is converted to a direct current for charging the vehicle battery. The general construction and operation of vehicle alternators is well known to those having ordinary skill in the art.

Terminal assembly 32 is used to electrically connect stator leads 36 to appropriate diodes in rectifier 34 and includes several conductive members 38 which may take the form of conductive tracks and an overmolded electrically insulative plastic body 40. In the illustrated embodiment, the conductive members 38 form arcuate tracks that overlay the circular path of the stator windings 30. Each of the conductive members 38 has a terminal 42 that connects the member 38 with rectifier 34. (Rectifier 34 is schematically depicted in FIG. 1 and FIG. 1 does not necessarily accurately depict the size and position of rectifier 34.) As discussed in greater detail below, the conductive member may also include a terminal or integral connector that is used to electrically connect member 38 to a stator lead 36.

Stator leads 36 are each formed by the end portion 44 of a winding 30. As best understood with reference to FIG. 6A, windings 30 have an exterior layer of an electrically insulative material 46 disposed on an electrically conductive core 48. In the illustrated embodiment, exterior layer 46 is a varnish applied to conductive core 48 in the form of a single strand copper wire. Other suitable materials and combinations may also be used to form an insulative exterior layer 46 and conductive core 48.

Figure 2:
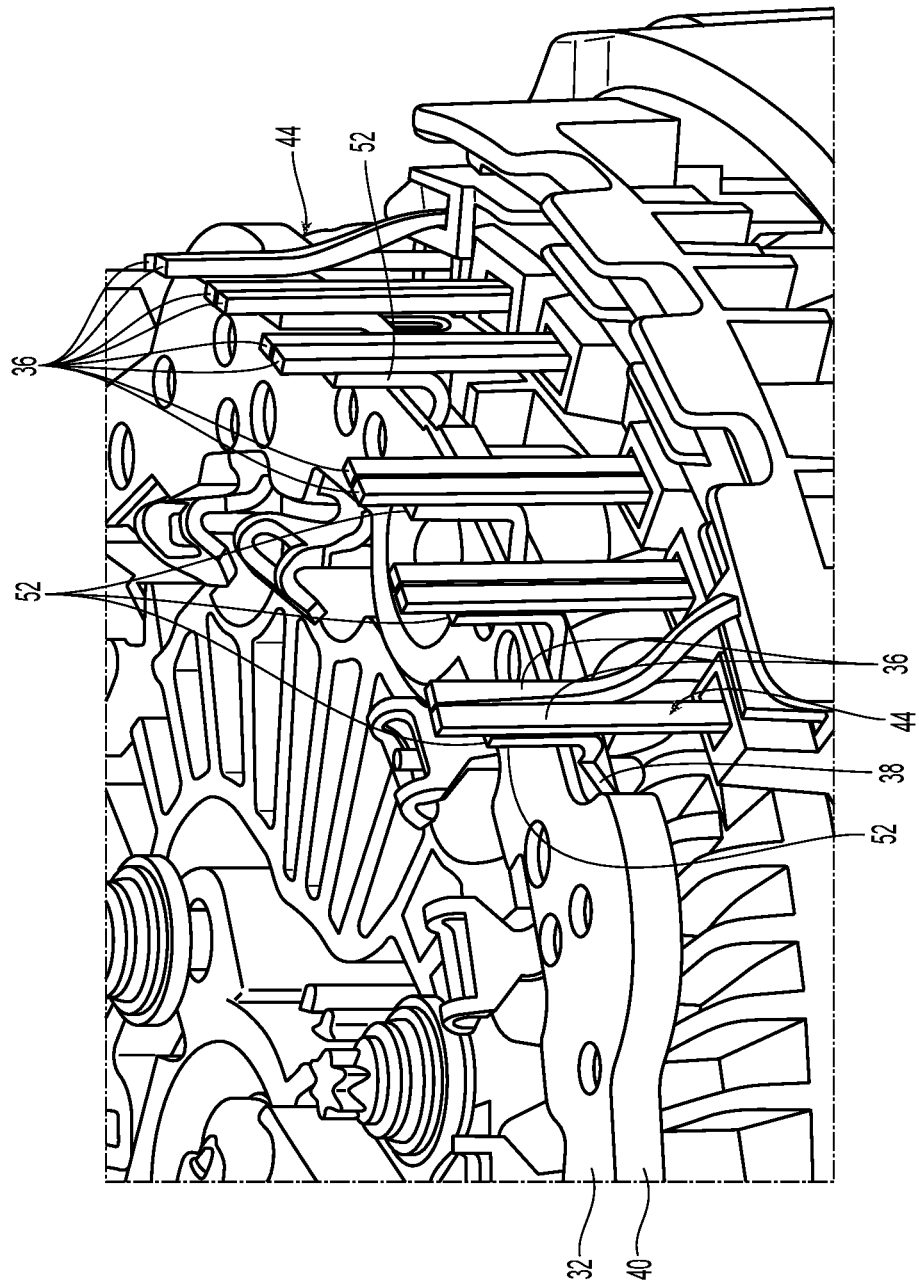
FIG. 2 is a partial perspective view of an electric machine showing a plurality of stator leads.
Figure 3:
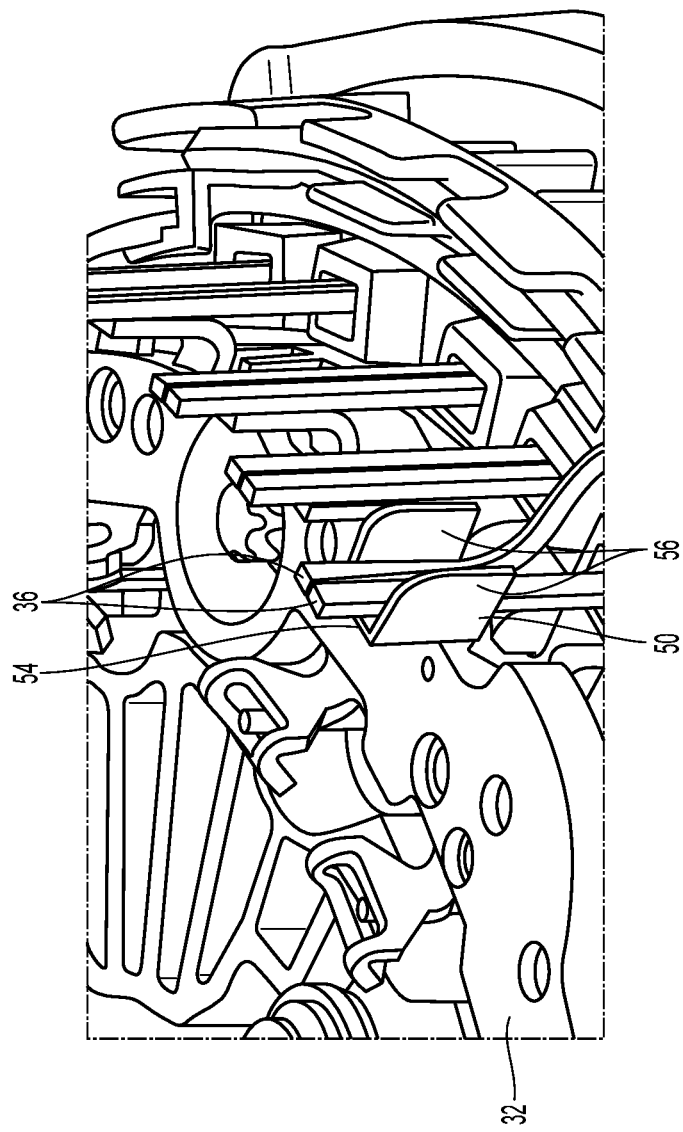
FIG. 3 is the same partial perspective view of an electric machine as FIG. 2 but which also shows a connector before is it is crimped to secure a pair of stator leads.
Figure 4:
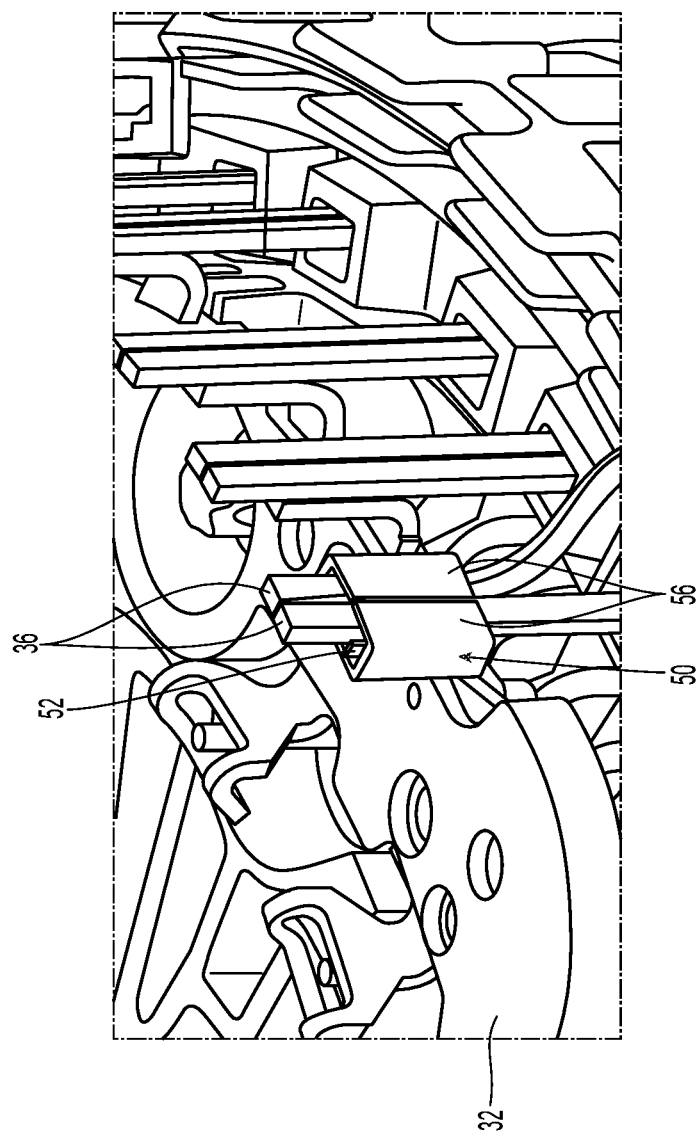
FIG. 4 is the same partial perspective view of an electric machine as FIG. 3 but which shows the connector crimped to secure a pair of stator leads.

FIGS. 2-4 illustrate how a C-shaped connector 50 can be used to electrically connect one or more leads 36 to a conductive member 38 of terminal assembly 32. FIG. 2 illustrates six pairs of leads 36 aligned with six terminals 52 which project from terminal assembly 32. In the illustrated embodiment, each of the terminals 52 are formed integrally with and project from one of the conductive members 38 of terminal assembly 32 and take the form of a simple wire like post.

Figure 5:
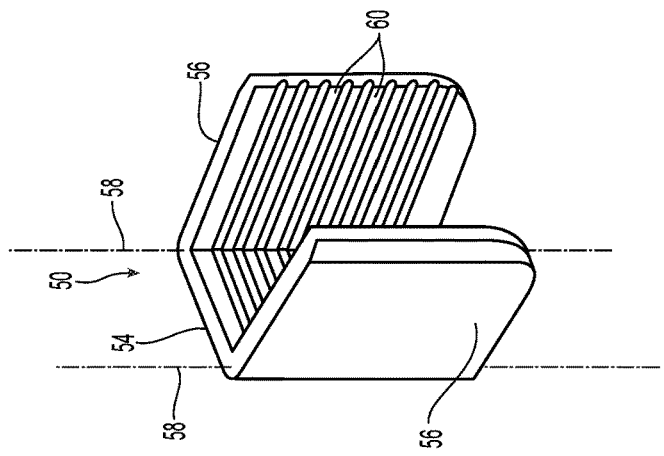
FIG. 5 is a perspective view of a connector.

C-shaped connector 50 is shown in FIG. 5 and is formed out of an electrically conductive material such as copper. C-shaped connector 50 has a central spine portion 54 and two arms 56 which are disposed on opposite sides of spine 54. Connector 50 also defines at least two bend lines 58 with at least one bend line 58 being disposed between spine 54 and each of the two arms 56. During the crimping process used to secure connector 50, one or more additional bend lines may also be formed in arms 56, however, such additional bend lines will not always be present.

Connector 50 also includes a plurality of projections 60. Projections 60 are formed out of an electrically conductive material and pierce the electrically insulative outer layer 46 to engage and electrically connect with conductive core 48 of a lead 36 as schematically depicted in FIG. 6A. In the illustrated embodiment of C-shaped connector 50, projections 60 define a plurality of parallel, linearly extending projections wherein each projection 60 extends in a direction perpendicular to bend lines 58. As best understood with reference to FIG. 5, each of the linearly extending projections 60 extend across both arms 56 and spine 54 from a distal edge 62 of one arm 56 to the distal edge 62 of the other arm 56.

As best understood with reference to FIGS. 3 and 4, C-shaped connector 50 is used to conductively connect each pair of leads 36 with a terminal 52. To connect leads 36 with terminal 52, a C-shaped connector 50 is positioned about the pair of leads 36 and terminal 52 as shown in FIG. 3. The opposing arms 56 of C-shaped connector 50 are then crimped to securely engage leads 36 and terminal 52 between spine 54 and one or both of the arms 56.

As the arms 56 are crimped, projections 60 pierce exterior insulative layer 46 to engage conductive core 48. The engagement of projections 60 with conductive core 48 conductively couples C-shaped connector 50 with the engaged lead 36. Connector 50 is also conductively coupled with a terminal lead 52 of conductive member 38 and thereby electrically connects a conductive member 38 with the lead 36, or pair of leads 36, that are engaged by the connector 50.

In the illustrated embodiment, conductive member 38 includes a projecting terminal 52 that is conductively coupled with connector 50. Terminal 52 can be positioned between spine 54 and one of the arms 56 with connector 50 being crimped to secure and conductively engage terminal 52 with connector 50. Alternatively, terminal 52 could be welded or soldered to the backside of spine 54 whereby it is not positioned between spine 54 and one of the arms 56, or, connector 50 could be integrally formed on the distal end of terminal 52. For example, conductive member 38, terminal 52 and connector 50 could all be formed out of a single sheet of metal material.

As can be seen in FIG. 6A, when a lead 36 is secured between spine 54 and an arm 56 of connector 50, projections 60 engage lead 36 on opposing sides of the lead 36 whereby at least a portion of the projections 60 engaged with the lead project toward each other. In this embodiment, the projections 60 on arms 56 when they are crimped against leads 36 will project toward projections 60 located on spine 54.

In the illustrated embodiment, each connector 50 is used to secure a pair of leads 36 wherein the leads 36 are wires which take the form of elongate elements that each define an axis 64. When securing a pair of leads 36 with connector 50, the leads 36 are advantageously arranged such that the axes 64 of each of the leads 36 are arranged parallel with each other and with the bend lines 58 of connector 50. In this regard, it is noted that such an arrangement does not require that the axes 64 of the leads 36 and bend lines 58 to be precisely parallel but merely substantially parallel to allow for the convenient engagement of leads 36 by connector 50 and the use of the term parallel herein is meant to include small deviations from a precisely parallel arrangement.

The positioning of linear projections 60 such that they extend perpendicular to axes 64 and bend lines 58 helps to prevent leads 36 from being pulled free from connector 50. It is noted that projections 60 do not need to be precisely perpendicular to provide such enhanced gripping but by positioning them substantially perpendicular to axes 64 and bend lines 58, the resistance of projections 60 to pulling a lead 36 out of engagement along the axis 64 of the lead 36 is enhanced. As a result, the use of the term perpendicular herein is meant to include small deviations from a precisely perpendicular arrangement. Similarly, the use of projections 60 which engage leads 36 on opposite sides of leads 36 also enhances the gripping of the leads 36 by projections 60.

For some applications, the mechanical engagement of leads 36 with connector 50 resulting from the crimping of connector 50 will be sufficient. However, it is also possible to additionally weld or solder connector 50 to leads 36 and thereby further enhance the connection between connector 50 and leads 36. For example, resistance welding can be used to provide a stronger joint between connector 50 and leads 36. Connector 50 may also be provided with a coating of tin, a silver alloy braze, such as that sold under the trademark Sil-Fos®, or other suitable coating to facilitate the welding or soldering of connector 50 to leads 36 and/or terminal 52. For example, the joint may be heated just enough to cause the reflow of the tin coating or other coating material.

When using a C-shaped connector 50, connector 50 may be used to grip and conductively engage a single lead 36 and a terminal 52, two leads 36 and a terminal 52 or any other number of leads 36 and a terminal 52. In other applications, C-shaped connector 50 could be used to connect a variety of different combinations of electrically conductive elements. The limiting factor being the size of connector 50 relative to the conductive elements to be engaged. It is also noted that one or more of the conductive elements, such as terminal 52, could be conductively coupled with connector 50 by means other than crimping between an arm 56 and the spine 54. For example, terminal 52 could be conductively coupled to connector 50 on the back side of spine 54 by welding or soldering or terminal 52 could be coupled with connector by being formed integrally with connector 50.

In the illustrated embodiment, connectors 50 are used to conductively couple a pair of leads 36 with a terminal 52. Each of the leads 36 includes an exterior layer of electrically insulative material 46 and a core of conductive material 48. Projections 60 on connector 50 are used to pierce the exterior layer 46 and conductively engage core 48. As mentioned above, projections 60 are arranged so that for both of the engaged leads 36, the projections 60 will engage the lead on opposing sides of the lead whereby at least a portion of the projections engaged with the conductive core will project toward each other.

When connector 50 is used to secure two leads 36, it will generally be advantageous if one of the leads 36 is engagingly gripped by connector 50 between spine 54 and one of the arms 56 and the second lead 36 is engagingly gripped by connector 50 between spine 54 and the other arm 56. In some instances, additional conductive elements may be engaged by connector 50. For example, in the embodiment of FIG. 4, connectors 50 are used to secure two leads 36 and terminal 52 with terminal 52 and one lead 36 engaged between spine 54 and one of the arms 56, and the second lead 36 being engaged between spine 54 and the other arm 56. It is additionally noted that in such an arrangement one of the leads 36, or the terminal 52, may be positioned somewhat centrally and be engaged between spine 54 and both of the arms 56.

In other words, FIG. 4 illustrates an application wherein conductive member 38 includes a projecting terminal 52 that is conductively coupled with connector 50 wherein terminal 52 is disposed between one of the arms 56 and the spine 54 and is conductively engaged by at least a portion of the plurality of projections 60. Terminal 52 may differ from leads 36 in that it may have an exterior surface 53 defined by a conductive material. In such an application having an uninsulated terminal 52, projections 60 do not pierce an exterior insulative layer, however, they still help to firmly engage and secure terminal 52. For some applications, it may be advantageous to provide terminal 52 with an exterior layer of electrically insulative material, in which case, projections 60 would be used to pierce the insulative layer on terminal 52 just as they pierce layer 46 on leads 36.

While it is desirable for the projections to pierce the outer insulative layer of the leads 36 and thereby conductively couple the connector with the lead and enhance the mechanical connection, it is also desirable for the stator leads 36 to maintain their structural integrity. For example, if the projections cut too deeply into the stator leads 36, the projections could either sever the stator lead or leave such a small core of unsevered material that it might be excessively weakened and likely to suffer mechanical failure. Similarly, when projections on the connectors are used to engage a terminal 52 having an exterior surface 53 formed out of a conductive material, it is desirable for the terminal 52 to retain its structural integrity.

Figure 6B:
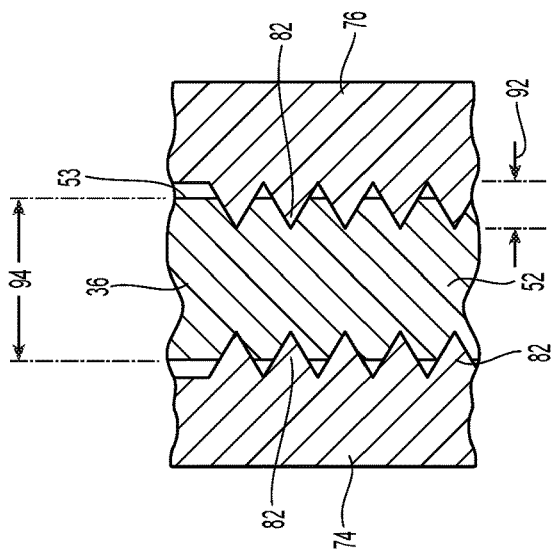
FIG. 6B is a schematic cross sectional view showing a connector crimped onto an uninsulated terminal.
Figure 6A:
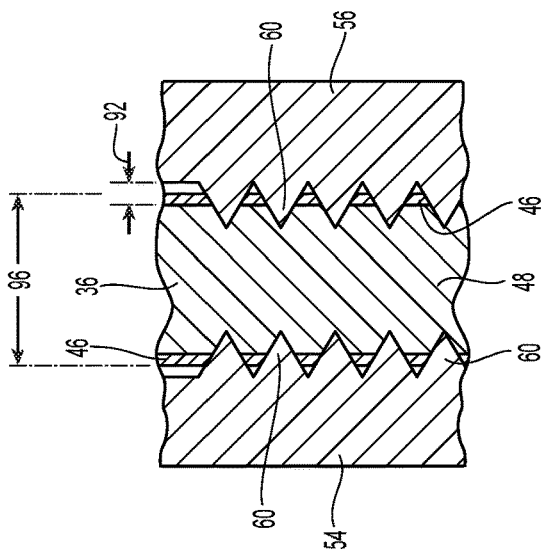
FIG. 6A is a schematic cross sectional view showing a connector crimped onto a stator lead.

As can be seen in FIGS. 6A, 6B, projections 60, 82 on the connectors define a projecting length 92 by which the projections extend from the connector. FIG. 6A illustrates a lead 36 which defines a thickness 96 that is more than twice the projecting length 92 of the plurality of projections. By providing lead 36 with a thickness that is more than twice the projecting length 92 of the projections, the severing of the lead 36 by the projections is avoided. Advantageously, thickness 96 is at least four times projecting length 92 of the projections this arrangement ensures that a significant portion of the lead 36 is not severed by the projections.

Similarly, FIG. 6B illustrates a terminal 52 that has an exterior conductive surface 53 and defines a terminal thickness 94 which is more than twice the length 92 of the projections. Advantageously, terminal thickness 94 is at least four times projecting length 92. It is noted that the thickness of the lead 36 and terminal 52 refers to the largest dimension of the lead 36/terminal 52 between the two opposing surfaces of the lead 36/terminal 52 that are engaged by opposing arms of the connector. Thus, if the lead 36/terminal 52 had a circular cross section, the thickness of such a lead 36/terminal 52 would be the diameter of the circular cross section.

It is further noted that FIG. 4 illustrates a single connector 50 securing a pair of leads 36 and a terminal 52. When the electric machine depicted in FIG. 4 is completed, five additional connectors 50 will have been installed. As can be seen in FIG. 4, each of the five additional connectors 50 will also secure a pair of leads 36 and a terminal 52. As will be readily understood by those having ordinary skill in the art, the number of connectors required for a particular electric machine will depend upon the design and number of phases of that particular electric machine.

Figure 8:
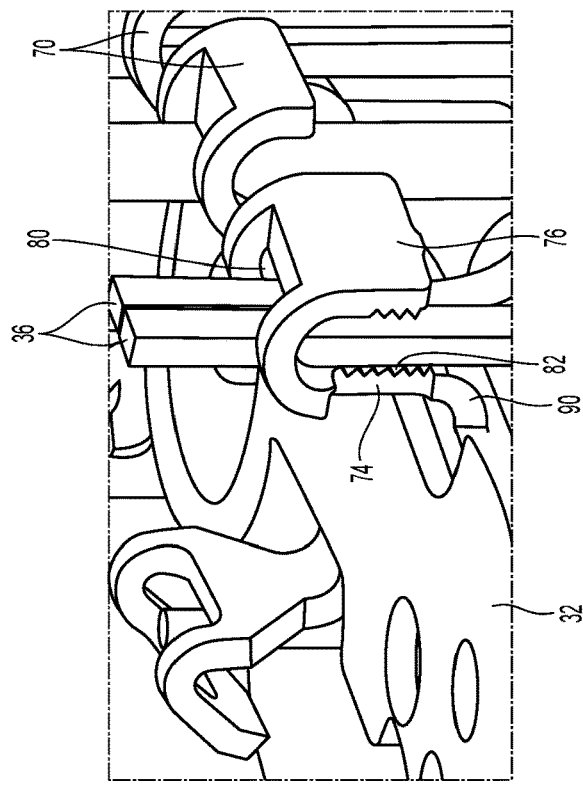
FIG. 8 is a perspective view showing the connector of FIG. 7 engaged with a pair of stator leads.
Figure 7:
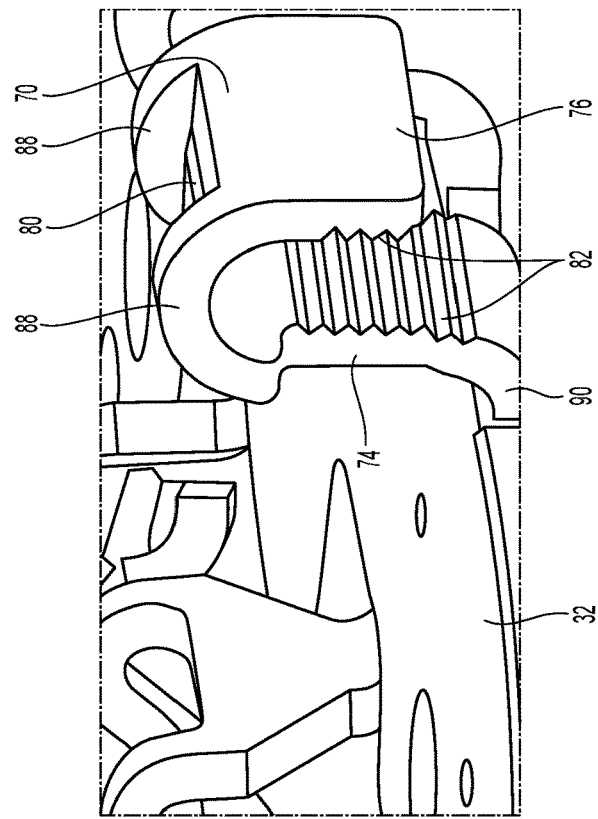
FIG. 7 is a perspective view of an alternative embodiment of a connector.
Figure 9:
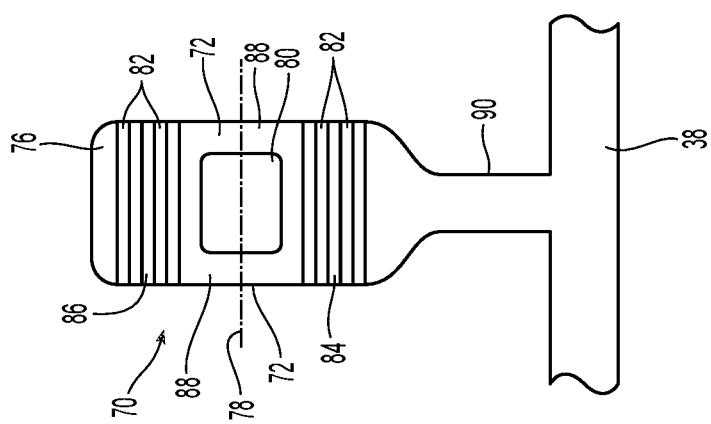
FIG. 9 is a plan view of the connector of FIG. 7 before it is bent into its use position.

An alternative embodiment is shown in FIGS. 7-9. In this embodiment, a U-shaped connector 70 is used to conductively couple stator leads 36 with conductive member 38. U-shaped connector 70 has a spine portion 72, a proximal arm 74 and a distal arm 76 and defines at least one bend line 78 between the arms 74, 76. A central opening 80 is disposed between the two arms 74, 76 and the conductive elements engaged by connector 70 extend through opening 80.

In the illustrated embodiment, each connector 70 is used to secure a pair of stator leads 36. The leads 36 are the same as those discussed above and include an exterior electrically insulative layer 46 and a conductive core 48. To connect leads 36, the leads 36 are positioned such that they extend through central opening 80 with axis 64 of the leads being positioned perpendicular to bend line 78. Arms 74, 76 are then crimped to securely engage the lead 36 or multiple leads 36 that extend through opening 80. As arms 74, 76 are crimped, the leads 36 are gripped by the connector between arms 74 and 76 and projections 82 located on arms 74, 76 pierce the exterior insulative layer 46 of leads 36 to conductively engage the core 48 of leads 36.

The crimping process forces the connector 70 to bend about bend line 78 as arms 74, 76 are biased into engagement with leads 36. It is noted that while at least one bend line 78 will be formed by this process, it is also possible, and in some circumstances may be advantageous, for the connector 70 to bend along more than one location as connector 70 is crimped. It is also noted that while the position of axis 64 relative to bend line 78 is described as perpendicular, small deviations from a precisely perpendicular arrangement that still allow leads 36 to extend through opening 80 and be gripped between arms 74, 76 are encompassed within the meaning of the term perpendicular as it is used herein.

A first portion 84 of the projections 82 are located an arm 74 while a second portion 86 of the projections 82 are located on arm 76. Projections 82 are shaped similarly to projections 60 in the form of a plurality of parallel, linearly extending projections having a substantially triangular cross section that forms a point at its most distal location. As a result, when projections 82 engage leads 36, the result will be the same as that illustrated in FIG. 6A for projections 60.

When projections 82 pierce the outer layer 46 of leads 36 to engage conductive core 48, the lead 36 will be engaged on opposing sides of the lead 36 by projections 82 such that some of the projections that are engaged with conductive core will project toward each other. In other words, the leads 36 will be engaged by some of the projections 84 located on arm 74 and some of the projections 86 located on arm 86. As a result, lead 36 will be engaged by projections 84 on one side and projections 86 on an opposite side and those projections 84 that are engaged with the lead 36 will project toward the projections 86 that are engaged with the lead 36.

In the illustrated embodiment, projections 82 are parallel, linearly extending projections that extend in a direction parallel to the bend line 78. As a result, when connector 70 is crimped onto one or more leads 36, the leads 36 will have axes 64 that are parallel with each other and extend perpendicular to both bend line 78 and projections 82. As mentioned above, the use of the terms parallel and perpendicular in the present application should be interpreted to include small deviations from such orientations provided that such deviations do not have an impact on the functionality of the device.

This arrangement of projections 82 and leads 36 facilitates secure mechanical gripping and helps to inhibit the pull out of leads 36 along axes 64. Similar to connector 50, the connection between U-shaped connector 70 and leads 36 can be enhanced by welding or soldering and connector 70 which may also be provided with a coating of tin, silver alloy braze or other suitable coating to facilitate welding or soldering.

As can be best appreciated with reference to FIG. 9, connector 70 may be formed integrally with conductive member 38 by stamping conductive member 38 and connector 70 from a single piece of sheet metal. FIG. 9 illustrates the metal stamping while still in a flat form and shows that an extension arm 90 extends from conductive member 38 to integrally connect it with connector 70 which is disposed at the distal end of extension arm 90. When stamping conductive member 38, extension arm 90 and connector 70 from a single piece of sheet metal, the projections 82 could be impressed thereon in the same stamping process or be formed in a subsequent stamping or machining process. As can also be seen in FIG. 9, spine 88 is formed by two hinge arms 88 located on opposite sides of central opening 80.

Alternatively, connector 70 can be a separate part and be used to engage a terminal extending from conductive member 38 together with the leads. It is noted that FIG. 6B illustrates an embodiment wherein a connector 70 is separate from the conductive member 38 and is used to engage a terminal 52 having a conductive exterior surface 53 to thereby conductively couple the connector 70 with the conductive member 38.

After overmolding the required number of conductive members 38 to form terminal assembly 32, hinge arms 88 are bent along bend line 78 so that connector 70 takes a generally U-shaped configuration as shown in FIG. 7. This initial bending of connector 70 may alternatively take place before the conductive member 38 is overmolded to form terminal assembly 32. The initial bending of connector 70 leaves sufficient space between arms 74, 76 to allow stator leads 36 to be inserted through opening 80. When using terminals 52 and with a connector that is not integrally formed with conductive member 38, terminals 52 will generally not be overmolded so that terminals 52 will take the form of bare copper while the majority of conductive members 38 are overmolded. When employing a connector that is integrally formed with conductive member 38, the extension arm 90 and connector will generally not be overmolded. Overmolding the connector would require subsequent removal of the overmolded polymeric material from the connector and this will generally be undesirable.

After the desired number of leads 36 are inserted through opening 80, arms 74, 76 are crimped toward each other to firmly engage the inserted leads 36. FIG. 8 illustrates a connector 70 which has been crimped to engage a pair of leads 36. Because the illustrated connector 70 in FIGS. 7-9 is formed integrally with conductive member 38, there is no need to couple connector 70 with a terminal projecting from conductive member 38. It is also noted that while the depicted embodiment has connectors 70 which engage a pair of leads 36, alternative embodiments could employ connectors 70 that engage a single lead 36 or a greater number of leads 36 or other conductive members. Moreover, it is not necessary for connector 70 to be formed integrally with conductive member 38 and it could be used to engage a pair of leads 36 and a terminal 52 projecting from conductive member 38 as exemplified in FIG. 6B.

Generally, multi-phase electric machines will require more than one connector for use with stator leads and the electric machine depicted in FIG. 8 has a plurality of integrally formed U-shaped connectors 70 that are each conductively engaged with a pair of stator leads wherein each lead of the pair of leads forms the end of a stator winding and has an exterior layer of electrically insulative material overlying a core of conductive material.

It is additionally noted that the shape of the illustrated projections 60, 82 are all linearly extending projections with a triangular cross section that forms a point at its most distal location. While this shape is efficient to manufacture and functional, other shapes and geometries can also be used so long as the alternative geometries will pierce through an exterior insulative layer to engage the conductive core of the stator lead or other insulated conductive element being engaged.

While this invention has been described as having an exemplary design, the present invention may be further modified within the spirit and scope of this disclosure. This application is therefore intended to cover any variations, uses, or adaptations of the invention using its general principles.

What is claimed is:

1. An electric machine comprising:
a rotor and a stator wherein the stator includes at least one winding;
a first end of the winding defining a first lead, the first lead of the winding having an exterior layer of an electrically insulative material disposed on an electrically conductive core;
a conductive member; and
a connector conductively coupled with the conductive member for conductively connecting the conductive member with the first lead, the connector being formed of an electrically conductive material and being crimped to engage the first lead, the connector including a plurality of projections wherein the projections pierce the exterior layer of the first lead to engage the conductive core of the first lead and wherein the plurality of projections engage the first lead on opposing sides of the first lead whereby at least a portion of the projections engaged with the conductive core project toward each other.

2. The electric machine of claim 1 wherein the connector conductively connects the conductive member with a second lead wherein the second lead has an exterior layer of an electrically insulative material disposed on an electrically conductive core and the projections pierce the exterior layer of the second lead to engage the conductive core of the second lead and wherein the plurality of projections engage the second lead on opposing sides of the second lead whereby at least a portion of the projections engaged with the conductive core project toward each other.

3. The electric machine of claim 1 wherein the connector is a C-shaped connector having a spine and first and second arms disposed on opposite sides of the spine, the connector further defining first and second bend lines respectively disposed between the spine and the first and second arms, the first lead being an elongate element defining an axis wherein the axis of the first lead and the first and second bend lines of the connector are all arranged parallel with each other.

4. The electric machine of claim 3 wherein the plurality of projections define a plurality of parallel, linearly extending projections, the projections each extending in a direction perpendicular to the first and second bend lines.

5. The electric machine of claim 4 wherein each of the linearly extending projections extends across the first and second arms and the spine from a distal edge of the first arm to a distal edge of the second arm.

6. The electric machine of claim 1 wherein the conductive member includes a projecting terminal conductively coupled with the connector having an exterior surface defined by a conductive material and the terminal is disposed between one of the first and second arms and the spine and is conductively engaged by at least a portion of the plurality of projections.

7. The electric machine of claim 1 wherein the connector comprises a plurality of connectors, each connector being conductively connected to a pair of leads wherein each lead of the pair of leads forms the end of a stator winding.

8. The electric machine of claim 1 wherein the connector is a U-shaped connector having a spine and first and first and second arms disposed on opposite sides of the spine, the connector further defining at least one bend line between the first and second arms, the connector further defining a central opening disposed between the first and second arms; and
wherein the first lead extends through the central opening and is grippingly engaged by the connector between the first and second arms.

9. The electric machine of claim 8 wherein the first lead defines an axis that extends perpendicular to the at least one bend line and wherein the plurality of projections define a plurality of parallel, linearly extending projections, the plurality of projections each extending in a direction parallel to the at least one bend line, a first portion of the plurality of projections being disposed on the first arm and a second portion of the plurality of projections being disposed on the second arm.

10. The electric machine of claim 1 wherein the connector comprises a plurality of connectors, each connector being integrally formed with the conductive member and conductively connecting a pair of leads to the conductive member and wherein each lead of the pair of leads forms the end of a stator winding.

11. An electric machine comprising:
a rotor and a stator wherein the stator includes at least one winding;
a first end of the winding defining a first lead, the first lead of the winding having an exterior layer of an electrically insulative material disposed on an electrically conductive core;
a conductive member having a projecting terminal wherein the terminal has an exterior surface defined by a conductive material; and
a connector conductively coupled with the conductive member for conductively connecting the conductive member with the first lead, the connector being formed of an electrically conductive material and being crimped to engage the first lead and the terminal, the connector including a plurality of projections wherein the projections pierce the exterior layer of the first lead to engage the conductive core of the first lead and wherein the plurality of projections engage the terminal to thereby conductively couple the terminal with the first lead.

12. The electric machine of claim 11 wherein the plurality of projections engaged with the terminal pierce the exterior surface of the terminal and partially penetrate the terminal and wherein the terminal defines a first thickness more than twice a projecting length of the plurality of projections.

13. The electric machine of claim 12 wherein the lead defines a second thickness which is more than twice the projecting length of the plurality of projections.

14. The electric machine of claim 13 wherein each of the first and second thicknesses are at least four times the projecting length of the plurality of projections.

15. The electric machine of claim 11 wherein the connector is a C-shaped connector having a spine and first and second arms disposed on opposite sides of the spine, the connector further defining first and second bend lines respectively disposed between the spine and the first and second arms, the first lead and the terminal each being an elongate element defining an axis wherein the axes of the first lead and the terminal and the first and second bend lines of the connector are all arranged parallel with each other.

16. The electric machine of claim 11 wherein the connector is a U-shaped connector having a spine and first and first and second arms disposed on opposite sides of the spine, the connector further defining at least one bend line between the first and second arms, the connector further defining a central opening disposed between the first and second arms; and wherein the first lead and the terminal both extend through the central opening and are grippingly engaged by the connector between the first and second arms.

17. An electric machine comprising:
a rotor and a stator wherein the stator includes at least one winding;
a first end of the winding defining a first lead, the first lead of the winding having an exterior layer of an electrically insulative material disposed on an electrically conductive core;
a conductive member and a connector wherein the conductive member and the connector are both formed from a single sheet of conductive metal material; and
wherein the connector conductively connects the conductive member with the first lead, the connector being crimped to engage the first lead, the connector including a plurality of projections wherein the projections pierce the exterior layer of the first lead to engage the conductive core of the first lead.

18. The electric machine of claim 17 wherein the connector comprises a plurality of connectors, each of the plurality of connectors and the conductive member being formed out of a single sheet of conductive metal material.

19. The electric machine of claim 18 wherein the plurality of connectors are each a C-shaped connector having a spine and first and second arms disposed on opposite sides of the spine, each of the connectors further defining first and second bend lines respectively disposed between the spine and the first and second arms.

20. The electric machine of claim 18 wherein the plurality of connectors are each a U-shaped connector having a spine and first and second arms disposed on opposite sides of the spine, the connector further defining at least one bend line between the first and second arms, the connector further defining a central opening disposed between the first and second arms; and wherein the central opening is adapted to have the lead extend therethrough with the lead being grippingly engaged by the connector between the first and second arms.

* * * * *

UNITED STATES PATENT AND TRADEMARK OFFICE
CERTIFICATE OF CORRECTION

PATENT NO. : 10,181,658 B2
APPLICATION NO. : 15/087880
DATED : January 15, 2019
INVENTOR(S) : Kirk Neet, Christopher Bledsoe and James Paul Murphy It is certified that error appears in the above-identified patent and that said Letters Patent is hereby corrected as shown below:

In the Claims

Claim 8, Column 12, Lines 4-5, the phrase "a U-shaped connector having a spine and first and first and second arms" should read -- a U-shaped connector having a spine and first and second arms --.

Claim 16, Column 13, Lines 4-5, the phrase "a U-shaped connector having a spine and first and first and second arms" should read -- a U-shaped connector having a spine and first and second arms --.

Signed and Sealed this
Nineteenth Day of February, 2019

Andrei Iancu
*Director of the United States Patent and Trademark Office*